March 16, 1954 C. E. LOMAX 2,672,513

TELEPHONE SYSTEM

Filed July 29, 1950 4 Sheets-Sheet 1

FIG. I

INVENTOR.
CLARENCE E. LOMAX

BY

Chas. W. Candy

ATTORNEY

March 16, 1954 C. E. LOMAX 2,672,513

TELEPHONE SYSTEM

Filed July 29, 1950 4 Sheets-Sheet 2

INVENTOR.
CLARENCE E. LOMAX

BY [signature]

ATTORNEY

March 16, 1954 C. E. LOMAX 2,672,513

TELEPHONE SYSTEM

Filed July 29, 1950 4 Sheets-Sheet 3

INVENTOR.
CLARENCE E. LOMAX

BY Chas. W. Conly

ATTORNEY

March 16, 1954 C. E. LOMAX 2,672,513

TELEPHONE SYSTEM

Filed July 29, 1950 4 Sheets-Sheet 4

INVENTOR.
CLARENCE E. LOMAX

BY Chas. W. Candy

ATTORNEY

Patented Mar. 16, 1954

2,672,513

UNITED STATES PATENT OFFICE 2,672,513

TELEPHONE SYSTEM

Clarence E. Lomax, Chicago, Ill., assignor to Automatic Electric Laboratories, Inc., Chicago, Ill., a corporation of Delaware Application July 29, 1950, Serial No. 176,755

9 Claims. (Cl. 179—6.3)

This invention relates in general to telephone systems and more particularly to an automatic telephone system serving both regular and pay stations; and still more particularly, it relates to an automatic telephone paystation system wherein coin actuation is value discriminatory.

It is the main object of the invention to provide an automatic telephone system wherein the circuit arrangement is such that a call from a paystation can be made only when a coin of at least a predetermined value is deposited.

Another object of the invention is to provide means whereby a coin of lesser value than said predetermined value when used in attempt to make a call from a paystation is returned to the user without effect.

A further object of the invention is the provision of an improved selector circuit for the system which can identify the type of substation calling as well as determine whether the proper value coin has been deposited in case the call is originating from a paystation and respond accordingly.

Still another object of the invention is the provision in the system of improved primary and CLR paystation trunks.

In accordance with the above enumerated objects, a feature of the invention resides in the means for returning a coin of less than the proper value after the first digit of the desired number is dialled.

Another feature of the invention resides in the sending of an identifying signal after the first digit has been dialled where the proper value coin has been deposited.

Another feature of the system resides in provision of a paystation control trunk serving both paystations and regular stations, but arranged to be bypassed by calls from regular lines.

Another feature of the system resides in a new and improved selector which gives station identification as to a calling line to a toll operator by two means, visual and audio.

And still another feature of the invention resides in the automatic refunding means when the toll operator is reached.

These and other objects and features will be more particularly described in the following specification and appended claims taken in conjunction with the accompanying drawings in which:

Figure 1:
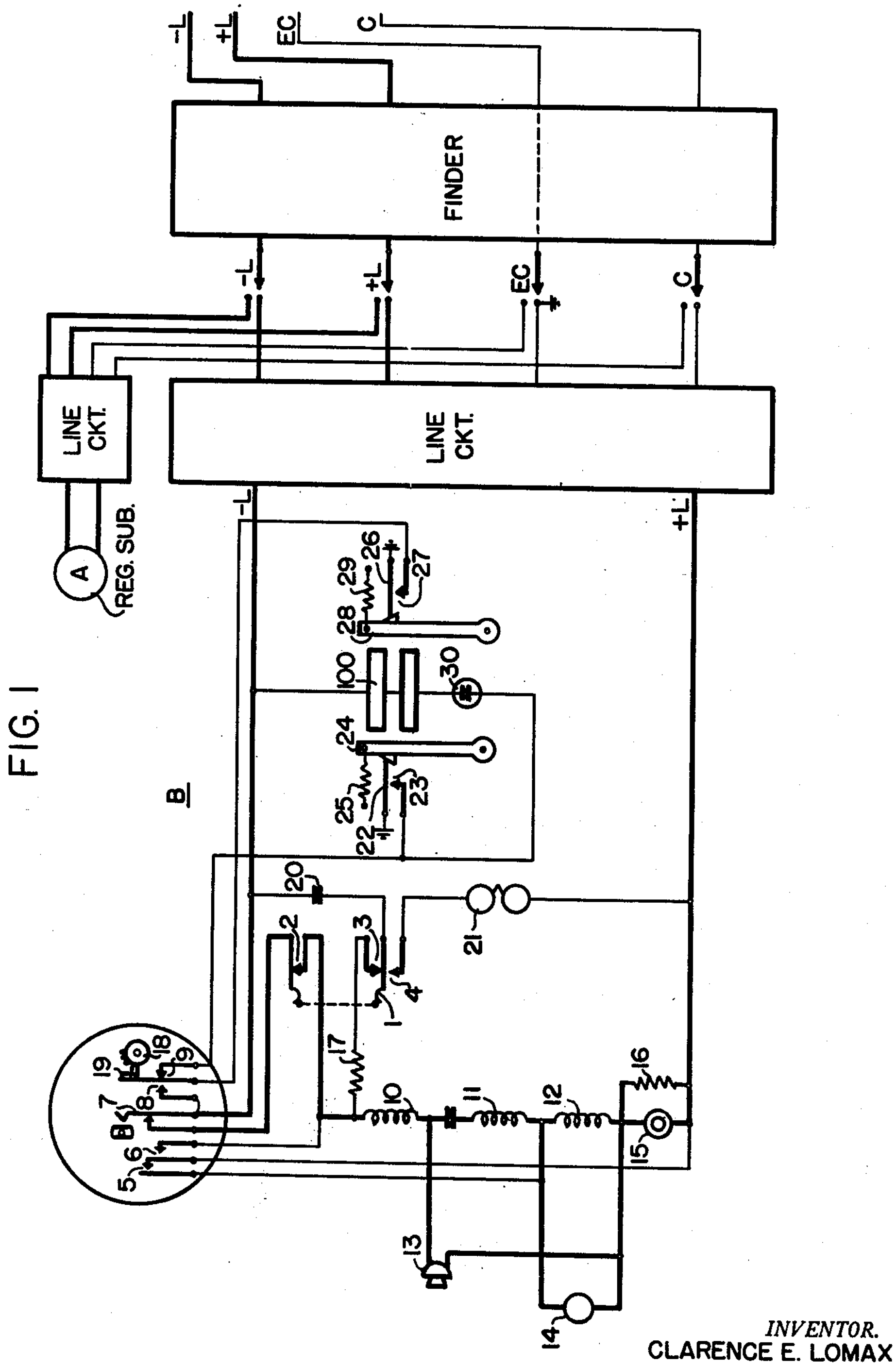
Figure 1 shows a paystation circuit B in detail, a regular subscriber substation A schematically and block diagrams of their respective line circuits and a four wiper finder serving them.

Referring now to the drawings, a general resumé of the invention follows.

The automatic telephone paystation system of the instant invention comprises four main elements, a coin controlled substation, a paystation trunk, a selector and a combined line and recording trunk, the latter hereinafter to be referred to as a CLR trunk. A conventional line circuit and a four wiper finder are shown schematically and beyond their normal functions, do not have any special significance in the instant application.

The pay-substation circuit is similar to that shown in U. S. Patent 2,214,259, issued to Pye, September 10, 1940 with modifications adapting it to use as a paystation, namely coin actuated contacts, a coin magnet and an internal coin transmitter; and also, for the purposes of this invention to be brought out in detail hereinafter, the dial employed is somewhat similar to that shown in U. S. Patent 2,366,647, issued to Ostline, January 2, 1945.

The coin actuated contacts differ from that found in a conventional paystation in that one is placed to be actuated by nickels while another is positioned to be acted upon by dimes and quarters. Mechanical latches for these contacts or triggers are provided which lock the contact in operated position after a coin has acted upon it. The coin disposal magnets are so arranged as to release either or both latches whenever coin disposal potential energizes the magnets. One of the purposes of this arrangement is to require an increased initial deposit to actuate a call while providing means for refunding coins of a value lesser than that required for actuation. A discharge device in the form of a neon tube has been placed in the coin disposal magnets energizing circuit, the purposes for which will be detailed hereinafter.

The special dial described in the reference Patent No. 2,366,647 permits a momentary ground pulse to be transmitted at the completion of a dialled digit. For this purpose, the springs normally used in the reference patent for station identification are employed.

A conventional line circuit is employed for both paystations and regular subscribers' substation equipment.

The finder employed is also conventional, and has four wipers. The fourth wiper discerns whether a call originates from a paystation or a regular subscriber. To accomplish this, the bank contact for the fourth wiper is grounded for paystations and open for regular subscribers. A four wiper finder similar to the one shown schematically herein is described in an application of Lomax, Serial No. 702,846, filed October 11, 1946, not yet issued.

Figure 2:
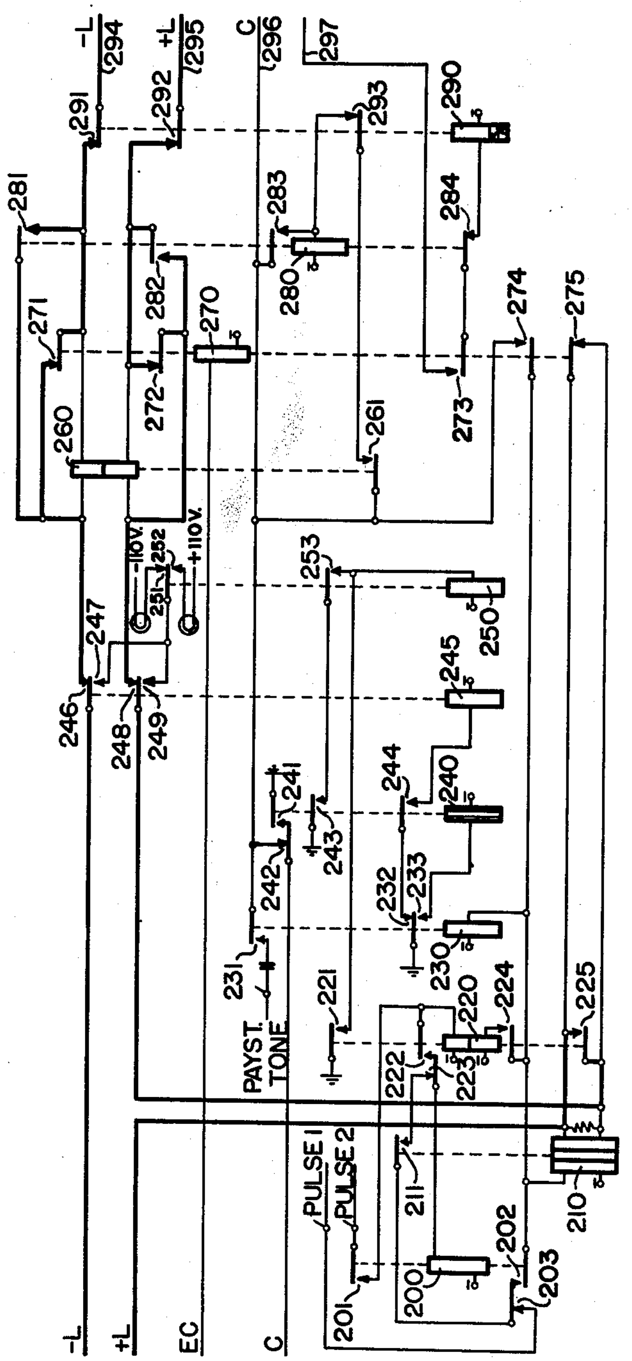
Figure 2 shows in detail the circuit arrangement of a paystation control trunk serving the substation equipment in Figure 1.

The paystation trunk in Figure 2 is so arranged to by-pass calls from regular subscribers but operates responsive to a paystation initiated call. Other features of this trunk circuit will be detailed hereinafter.

Figure 3:
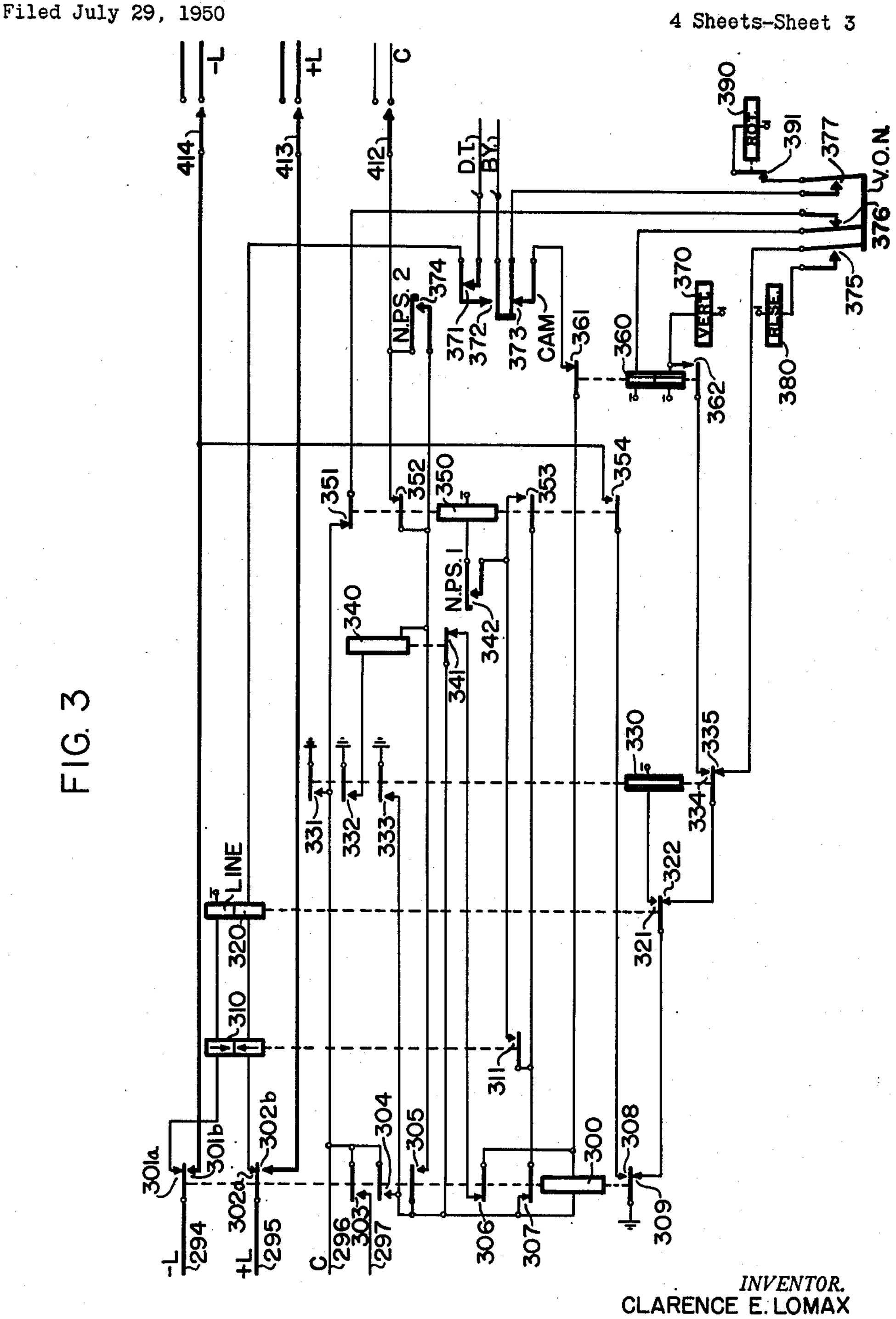
Figure 3 shows a detailed selector circuit.

Figure 3 shows an improved selector circuit which permits better line identification between paystation calls and regular subscriber calls, as well as increases the efficiency of the finders, selectors, CLR trunks and toll operators.

Figure 4:
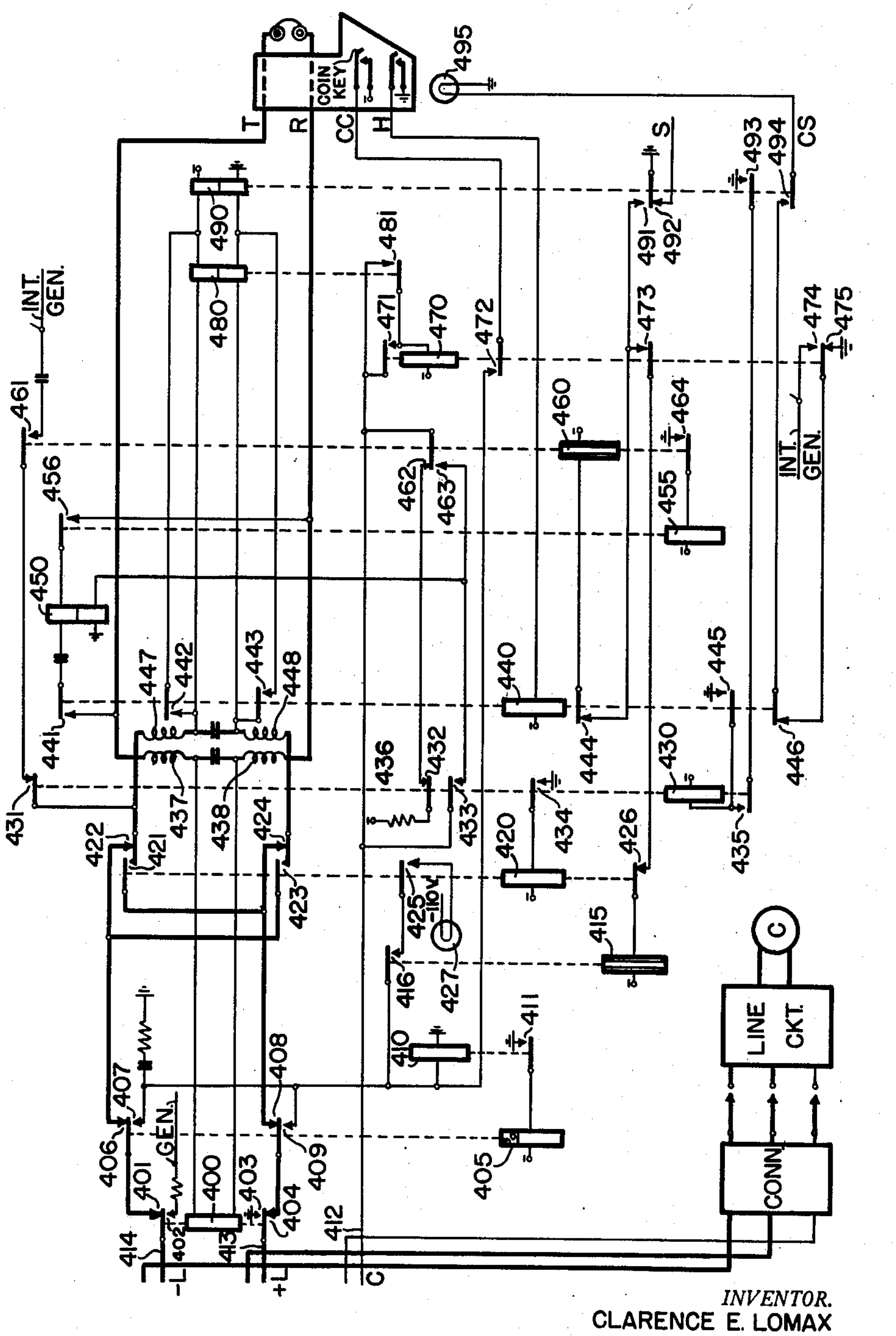
Figure 4 shows a detailed combined line and recording (CLR) trunk as well as schematically showing a connector, line circuit and regular subscriber substation C.

Figure 4 shows a new CLR trunk to operate with the above switch train and equipment. It is so constructed to distinguish toll calls of regular lines from paystations and gives coin service only to the latter.

These and other features will be detailed hereinafter.

Having briefly described the invention, a detailed description follows. In this respect, several calls will be described from and to the various types of equipment served and in this manner, it is believed, a more complete and detailed description will be accomplished.

*Paystation local call, less than a dime deposited*

Assume that it is desired to make a local call from paystation B to another phone served by the same exchange, such as C. When the hookswitch 1 is raised, a loop circuit is closed to the line relay, not shown, in the line circuit over line —L, pulsing contact 7 of the dial, hookswitch contact 2, induction coil winding 10, transmitter 13, tone transmitter 15 and tone transmitter resistance 16, and over the +L line. The line relay upon energizing over this loop starts the finder in well known manner and as soon as the finder finds the calling line, dial tone from the selector is placed on the +L line from dial tone generator D. T. thru contact 371, lower windings of relays 320 and 310 and contact 302A. The calling party hearing this tone knows that a finder-selector link is in readiness for him and he may now deposit his coin.

As previously stated in the general description, the mechanism of the paystation is so arranged as to have nickels operate spring 22 only, while dimes and quarters operate spring 26 only. All coins are retained in the hopper in well known manner until disposed of, either refunded or collected. Either coin spring 22 or 26 will connect the coin magnet 100 between ground and the line so that disposal may be had. However, as a discharge device in the form of a gas filled tube 30 is in series with the coin magnet 100, the circuits to magnet 100 are not actually closed until booster potential is applied to the line, firing the tube and energizing the magnet. The purpose for this tube is to improve transmission by eliminating ground leakage thru the magnet and it improves the pulsing over the line for the same reasons.

It will here be remembered that one of the objects of this invention is to enforce the deposit of an increased amount of money before a call may be made. The arrangement shown requires that at least a dime or a quarter be deposited to initiate a call. The deposit of a nickel or no coin at all will result in no call being possible. However, the arrangement is such that a nickel so deposited is refunded. In this conneciton, it is to be noted, that the central office equipment is so arranged that the calling party must dial one digit before it is known whether the call will be permitted to go through and before the undervalue coin is refunded.

Assume further that the party in this call thru inadvertence or even bent on fraud has only deposited a nickel upon hearing dial tone, or fails to deposit any coin at all.

As the calling party is at a paystation, the EC bank contact of the finder belonging to the paystation is permanently grounded. This ground over the lead EC thru winding of start relay 270 to battery energizes relay 270 of the paystation trunk circuit. In operating, relay 270 opens contacts 271, 272 and 275 thereby removing the shunts from relays 260 and 210 respectively. With their shunts removed, current flows thru both windings of shunt field relay 210 and differential relay 260. These circuits are traced from Dial Tone (D. T.) ground thru contact 371, lower windings of relays 320 and 310, contact 302A, conductor 295, contact 292, lower winding of differential relay 260, contact 248, right-hand winding of shunt field relay 210, over the +L conductor, thru the substation loop hereinbefore described, back over —L conductor, contact 246, upper winding of relay 260, contact 291, conductor 294, contact 301A, upper windings of relays 310 and 320 to battery; and from ground on the C lead of the finder thru contact 242, contact 274 closed by operation of relay 270 and thru the left-hand polarizing winding of shunt field relay 210 to battery. Altho current flows thru the circuits just described, neither relay 210 nor 260 operate at this time due to their directional windings. Relay 270 in closing contact 274 also causes relay 230 to energize, the circuit therefor is traced from ground on the C lead of the finder thru contacts 242 and 274, winding of relay 230 to battery. Relay 230 in operating closes contact 233 causing relay 240 to energize from ground thereon. Relay 240 closes contact 241 and opens 242 placing ground therethru forward on the finder C lead to hold the finder busy against other calls.

In case the calling party deposited only a nickel, spring 22 is operated and locked under latch 24 which connects the coin magnet 100 thru the ground thereon to the line, but since the gas filled tube 30 is in series therewith, there is no operating ground on the —L line to unbalance and operate differential relay 260. If no coin has been deposited the same is true except that the coin magnet 100 is not connected thru ground to the —L line as neither spring 22 or 26 would be operated. At this point, the calling party hearing dial tone begins to dial the first digit of his number. The dial in returning, pulses line relay 320 in the selector over the circuit already traced for causing current to flow thru relays 260 and 210. In closing contact 321, the initial operation of relay 320 operates release relay 330 from ground thru contact 308, 321 winding of relay 330 to battery. Release relay 330 being sleeved for slow release holds operated during the pulsing. Relay 330 closes contact 331 placing ground thereon thru contact 351, Vertical Off Normal (VON) Contact 376 and upper winding of relay 360 to battery. Relay 360 operates and closes a parallel circuit to its lower winding and vertical magnet 370 at contact 362. The first digit dialled pulses now alternately open and close pulsing contact 322 stepping the vertical magnet 370 of the selector from ground thru contacts 309, 322, 334, 362, vertical magnet winding to battery. The selector therefore steps vertically to the selected level.

It may be seen that after the first vertical step the Vertical Off Normal Springs operate and thereby open the original energizing circuit for relay 360. During the remaining vertical pulsing period relay 360 is held operated through its lower winding. Shortly after the vertical stepping, relay 360 restores, as its circuit is opened at contact 334, and thus closes the circuit to the rotary stepping magnet at contact 361. The selector then seizes an idle trunk marked with battery by rotary stepping in well known manner; the rotary stepping circuit traced from ground thru closed contacts 333, 341, 306, 361, cam contact 373, now closed VON contact 377, rotary interrupter contact 391, rotary magnet 390 to battery. This stepping continues self interrupted until the C wiper encounters a battery marked idle trunk bank contact, which battery operates rotary stop relay 340 from said battery thru resistance 436, contacts 432, 463, conductor 412, contact 352, winding of Rotary Stop relay 340, contact 332 to ground. Stop relay 340 in operating opens the rotary stepping circuit at contact 341. An idle trunk having been seized on the selected level, switching relay 300 operates from ground thru contact 333 over a circuit therethru, thru winding of relay 300 and over the remainder of the rotary stepping circuit to battery on the rotary magnet. The current is insufficient to operate the rotary magnet in series with relay 300 altho sufficient to energize the latter. Switching relay 300 closes contact 303 energizing relay 290; the circuit is traced from ground on the C lead thru contacts 303, 273, 284, winding of reject cycle relay 290 to battery. Reject relay 290 operating opens the line circuit loop at contacts 291 and 292 allowing the selector switch to release.

Relay 320 therefore restores and opens the circuit to the release relay 330 at contacts 321. After an interval, slow to release relay 330 restores and prepares a circuit to release magnet 380 at contact 335. Relay 330 also, in restoring, opens the energizing circuit to relay 340 at contact 332 causing relay 340 to restore. Relay 330 also, in restoring and opening contact 333, opens the energizing circuit to relay 300, causing it to restore. Relay 300, in restoring and closing contact 309, causes the release magnet 380 to operate over the following circuit: ground, contacts 309, 322, 335, 375, release magnet 380 to battery. The selector switch then returns to normal in a well known manner. When relay 330 falls back, opening contact 331, relays 230 and 290 also release. Relay 290 is slugged so that it is slower to release than relay 230. While 290 is still holding up on its residual energy, relay 230 in releasing closes contact 232. As relay 240 is also slow to release, contact 244 momentarily remains closed so that disposal relay 245 operates; the circuit is traced from ground thru contacts 232, 244, winding of relay 245 to battery. Relay 245 in operating closes contacts 247 and 249 which applies −110 volt refund potential thru contact 247 to the −L line which will fire the neon tube 30 and energize the disposal magnets 100 to ground on locked spring 22 if a nickel has been deposited. The negative booster potential tips the polarized coin disposal magnets to refund position in well known manner and the nickel, if deposited, is refunded. In operating, magnet 100 releases latch 24 opening contact 22. If no coin had been deposited, no refund is necessary nor can it be made for lack of ground thru either coin spring.

After a slight delay, slow to release relay 240 falls back opening ground contact 242 which releases the finder. It also opens contact 244 releasing disposal relay 245.

It is therefore apparent, that any attempt to initiate a call with no coin or an undervalue coin such as a nickel is frustrated upon completion of the first digit dialled.

*Paystation local call, proper deposit*

Assuming now that the caller is again at paystation B and wishes to make a local call. Having removed the handset or receiver from the hookswitch, the same loop circuit is closed and the finder operates to find the line extending the calling loop thru the paystation trunk to the selector as traced in the preceding section. Upon hearing dial tone as described in the preceding section, assume further that the caller deposits the proper tariff, namely a dime. The dime, or for that matter, a quarter, operates coin spring 26 which closes contact 27 and mechanically locks beneath latch 28. In so doing, the coin disposal magnet 100 in series with neon tube 30 is connected from ground on spring 26 through dial contact 9 to the −L line. The same switch train seizure sequence as before recited having taken place responsive to raising of the hookswitch, the caller now dials the first digit of his number as before. Just after the last pulse of the digit is sent, dial spring 19 is acted upon by cam 18 in a manner pointed out in reference to Patent No. 2,366,647 and in so doing momentarily closes contact 8 sending a ground pulse originating from the ground on coin spring 26 thru contact 8 and out over the −L line. This ground pulse unbalances the energized but unoperated differential relays 260 and 310 causing them to operate. Relay 310 in operating momentarily at this time has no effect as the selector has not stepped to the toll level, viz the tenth level. The effect of relay 310 will be fully described hereinafter in the toll call. Differential relay 260 in operating closes a circuit at contact 261 to relay 280, the circuit being traced from ground on the C lead at closed contact 331 thru contacts 261, 283, winding of relay 280 to battery. Relay 280 operating, closes contact 283 and locks to the ground on the C lead. Contact 281 is also closed by relay 280 shunting out the differential relay 260. This shunting is done to avoid transmission loss. Even though the ground pulse which operates relay 260 is sent after the impulses of the first digit are transmitted, there is more than ample time for relay 280 to operate before relay 300 can operate to cause 290 to operate.

A call may now be extended to subscriber C. The selector operates as hereinbefore described and selects an idle connector in the desired level. The operation of relay 300, causing the calling paystation to be extended through the selector, will not result in the energization of reject relay 290 (contact 284 now being open), as in the case of a call attempted with a nickel. The selector will, of course, not be released and will permit subsequent dialling by the calling subscriber to access the connector shown in the lower left hand corner of Figure 4. The call may thus be completed to subscriber C in a well known manner. Relay 280 in operating before relay 300, prevents relay 290 from energizing by opening its energizing circuit at contact 284. The called party answering causes a battery reversal in the connector in well known manner which reverses the field of the right hand winding of shunt field relay 210 which is in series with the +L line. The opposing magnetic fields cause the armature to be attracted. In so operating a circuit is closed to relay 200 thru contact 211, the circuit being traced from interrupted ground on "Pulse 1" lead thru contacts 203, 211, 223, winding of relay 200 to battery. Relay 200 in operating closes contact 202 and opens 203 locking itself thru contacts 223, 211, 202 and 274 to ground on the C lead. Pulse 2, timed to come after Pulse 1, then operates relay 220 thru contact 201. In operating, relay 220 closes contact 224 locking its lower winding therethru to the C lead also. In so operating, relay 220 opens the holding circuit to relay 200 at contact 223. Relay 200 releases when ground is removed from Pulse 2 and opens contact 201 before another pulse from Pulse 2 lead can keep it operated any longer. Relay 220 in operating closes ground thru contact 221 to battery on relay 250, whereupon relay 250 operates. Relay 250 operating closes contact 253, locking itself thru contact 243 to ground. The conversation continues with these relays operated.

Relay 220 in closing contact 225 shorts the right hand winding of shunt field relay 210 thereby removing its resistance from line +L for improved transmission.

When the conversation has terminated, the calling party in hanging up breaks the loop releasing the switch train as before described, only now relay 250 is operated and has contact 252 closed so that when relay 230 falls back, while relay 240 is yet operated on its sleeve stored residual magnetism, and disposal relay 245 operates as described in the preceding call, +110 volt collect potential is sent out over the −L line to fire tube 30 and operate disposal magnets 100 by completing its circuit thru dial contact 9 to ground on coin spring 26. As the coin is collected in well known manner, latch 28 is released and spring 26 restores. The paystation is ready for another call.

If the call just described is not answered, the caller in hanging up releases the switch train as before, but as relay 250 is not operated because there was never any battery reversal to begin the chain to accomplish this end, when disposal relay 245 momentarily operates, −110 volt refund potential is sent over the −L line refunding the dime in the same manner as for the nickel described in the preceding section.

Likewise, certain stations to which calls are to be made free, as perhaps fire, police or the local telephone office, are arranged so that no battery reversal occurs when the called station answers and therefore, when the conversation is completed and the caller hangs up, the same refunding sequence occurs as described immediately above for an unanswered call to a regular local station.

*Paystation toll call*

Assume now for the purposes of this illustration that the caller is at paystation B and wishes to make a toll call to some distant point. Of course, if after raising the hookswitch and hearing dial tone the caller does not deposit a coin of sufficient value, the same sequence of operation as described in the first call will occur after the last pulse of his first digit is dialled. Therefore assume further, that the proper amount, a dime or quarter has been deposited and coin spring 26 has closed ground therethru to connect the disposal magnets 100 to the −L line thru dial contact 9 and neon tube 30.

To make a toll call, the digit "0" is prescribed to obtain connection with the toll operator. The same series of relays are energized responsive to line seizure as described previously. Pulsing of the digit "0" pulses the line relay 320 in the selector ten times to raise the wipers ten vertical steps. The selector finding an idle toll operator's (CLR) trunk, switches through as previously described and connects it by its wipers to the preceding switch train. The loop is extended thru the selector by relay 300 at closed contacts 301B and 302B and extends over conductors 414 and 413 and wipers thru contacts 401 and 404, 406 and 408, 422 and 424, repeating coil windings 447 and 448, upper and lower windings of differential relay 480 and relay 490 to battery and ground respectively.

Relay 490 operates and in closing contact 491 causes relay 460 to operate over the following path: ground, contacts 491, 444, winding of relay 460 to battery. Relay 460 in operating and closing contact 464 causes relay 455 to operate over an obvious circuit. Relay 460 by closing contact 461 applies Ring Back Tone to the −L line. Relay 460 in closing contact 463 grounds the C lead through the lower winding of relay 450 to hold the switches. Relay 490 in closing contact 494 prepares a circuit to the operator's lamp 495. The ground pulse as sent from the dial, unbalances and operates differential relay 310 in the selector, closing contact 311 which in conjunction with the closing of normal post spring contact 342 which occurs on the tenth or toll level, a circuit is closed to operate relay 350 before the switching relay 300 switched the talking lines thru. This circuit is traced from ground at contact 333 thru contacts 307, 311 and normal post contact 342, winding of slow to release relay 350 to battery. Relay 350 in operating closes contact 353 to lock to its operating ground and closes contact 354 so that when the switch thru relay 300 operates extending the loop just described, contact 308 will place a ground on the −L line (conductor 414). Relay 300, operating when an idle trunk is found, opens the operating circuit to relay 350 at contact 307 but it being slow to release holds up long enough to momentarily place ground on the −L line after it has been extended thru to relays 480 and 490. This ground unbalances and operates differential relay 480 in the CLR trunk. In operating, 480 closes a circuit to operate relay 470 thru contact 481, the circuit for which is traced from ground on the C lead (conductor 412) thru contact 481, winding of relay 470 to battery. Relay 470 in operating locks to the C lead ground thru contact 471. This lock up is necessary until the end of the call so that the operator is able to check for station identification. As relay 490 and 470 are both operated, a circuit is closed from ground thru contacts 491, 473 and 426 thru winding of sleeved slow to release relay 415 to battery, operating relay 415. Signal relay 470 also causes contact 474 to close operating the operators call lamp 495 from interrupted generator (Int. Gen.) thru contacts 474, 446 and 494 to flash her call lamp over her call signal (CS) lead. A tone was also put on the C lead at contact 231 when relay 230 in the primary control trunk was operated. This tone additionally informs the operator that the call is from a paystation.

The operator plugs in her cord circuit in well known manner to answer and in so doing grounds the lead H to operate relay 440. Relay 440 operating closes ground at contact 445 to energize relay 430 directly. Relay 430 locks to ground at contact 493 closed by relay 490 and thru contact 435. Relay 430 closes ground thru contact 434 to relay 420 which energizes and also opens contact 431 to remove ring back tone.

Paystation identifying tone reaches the operator over the following circuit: contacts 231, 304, 305, Normal Post Contact 374, conductor 412, C wiper and C contact, contact 433 and through the lower winding of coil 450. By transformer action this paystation identifying tone is impressed across the top winding of coil 450 and thence to the operators T and R leads over contacts 441 and 456. Relay 420 in operating closes contacts 421 and 423 and opens 422 and 424 effecting a battery reversal on the line from battery and ground on relay 490. Relays 460 and 455 restore when their operating circuits are opened at contact 444 and 464 respectively. The ground on the C lead to hold the preceding train after relay 460 releases is supplied from the ground on lower winding of relay 450 and thru contact 433 closed by relay 430.

Negative 110 volt refund battery is closed at contact 425 by relay 420 and may be traced from —110 volt source and lamp 427 thru contacts 425, 416 to ground thru winding of high resistance relay 410. Relay 410 in operating closes ground thru contact 411 to operate relay 405. Relay 405 operates to close contacts 407 and 409 which permits the —110 volt refund potential to go out over both lines and automatically refund the initial coin deposited. This refund potential is applied only during the time it takes sleeved slow to release relay 415 to restore due to the opening of its operating circuit at contact 426 by relay 420. It will also be noted here that relay 470 has contact 472 closed so that the operator may manually control collect or refund over lead CC in well known manner from her operators position source of booster potential not shown. Relay 260 being shunted at this time cannot operate from this coin current. The operator may now determine of the caller where the call is to be made to put it thru and access the charges in well known manner. When the calling party answers she may manually collect over lead CC as explained before or in the event that she should forget, when the conversation is over and the calling party hangs up, automatic collection in the control trunk takes place as described in the local paystation call hereinbefore.

If the operator should like to rering the caller for any reason, such as an overtime charge, she applies battery and ground over her tip and ring lines (T and R) in well known manner to energize relay 400. This closes contacts 402 and 403 to put ringing current from GEN out over the loop and thru ringer 21 and back to ground at contact 403.

*Local call from a regular line*

Assume now that subscriber A wishes to call subscriber C. The primary control trunk is so arranged that it serves both paystations and regular lines. The EC leads of the finder bank contacts corresponding to regular lines are not grounded as were those of the paystations. When the calling party raises the switchhook at substation A for example, a line loop circuit is closed similar to that described for the paystation calls. The finder starts and seizes the line. As there is no ground on lead EC relay 270 does not energize and this prevents all the other relays in the paystation control trunk from operating. The loop is extended thru the paystation trunk talking conductors to the line relay of the selector. Hearing dial tone the party may dial. No ground pulse is sent after the finish of a digit by the regular line, the dial being of the well known type, and as a result differential relay 310 in the selector is not unbalanced and does not operate as it did in the paystation calls. The selector steps up and down in well known manner seizing the connector which serves subscriber C. When the connector connects subscriber C, the call may be carried on.

*Toll call from a regular subscriber*

As this call is made from a regular subscriber, again as in the local call just described from a regular subscriber, the paystation control trunk is bypassed as no ground is forthcoming from the EC lead finder bank contact. The selector extends the loop to battery and ground on relay 490 in the CLR trunk responsive to dialling digit "0" as described in the paystation toll call. However, no ground pulse is forthcoming at the end of the digit since the regular line is not equipped with the special dial. Therefore, relay 480 is not operated which does not permit relays 470 and 415 to operate. Relay 490 in closing contact 494 closes steady ground from contact 475 thru contact 446 to light operators call lamp 495 informing her that the caller is a regular line and not a paystation. Relays 460 and 455 operate as described in the paystation toll call and relay 460 applies ring back tone from the tone generator thru contacts 461 and 431 back over the line. Relay 460 also closes contact 463 to apply ground thru the winding of coil 450 into the C lead (conductor 412) to hold the preceding switches.

The operator in plugging in to answer the call in well known manner grounds lead H operating relays 440, 430 and 420 as described in the paystation call, removes ring back tone, reverses battery to the line, attempts to apply the tone identification to the operator's set which in this case will be unsuccessful as the call is from a regular line, and allows relays 460 and 455 to restore, as described hereinbefore. As relay 415 is not operated, collect battery is not applied to the line since contact 416 is open. The operator now asks for the toll call data and sets up and extends the call in equally well known manner.

What is claimed is:

1. In an automatic telephone system, a paystation including coin receiving mechanism and a calling device, a relay normally rendering said paystation ineffective for making a call, a marking potential, means included in said calling device and operated thereby immediately after a first digit is dialled for transmitting said marking potential, and said relay operated in receipt of said marking potential, for nullifying said ineffectiveness in case a coin of a certain predetermined value has been deposited.

2. In an automatic telephone system, a paystation including a calling device, a hookswitch and coin receiving means, a finder having a paystation trunk and selector associated therewith, means associated with said paystation and operated by said hookswitch when a call is initiated from said paystation for initiating the operation of said finder to find and seize said calling paystation, a relay associated with said trunk, means for operating said relay, means included in said calling device operable immediately subsequent to the termination of only the first digit dialled on said calling device for operating said last means to operate said relay, and means operated by the operation of said relay for determining that a coin of the proper value has been deposited in said coin receiving means and that the call is to subsequently be switched to completion.

3. In an automatic telephone system, a paystation including a calling device, a coin disposal magnet and receiving mechanism for coins of various denominations, a first spring in said mechanism operable by deposited coins of initially acceptable denominations, another spring in said mechanism operable by deposited coins of initially unacceptable denominations, means including a relay normally operable when the dialling of only the first digit on said calling device is completed and said other spring is operated, means operated by said relay for preventing a call from being further extended, means also operated by said relay for causing said coin magnet to refund coins initially unacceptable, a marking potential, means included in said calling device and operated thereby immediately after the first digit dialled is completed for transmitting said marking potential only when said first coin spring has been operated, another relay operated in receipt of said marking potential, and means operated by said other relay for nullifying said first relays effect.

4. In an automatic telephone system, a paystation including a coin disposal magnet, a calling device and coin receiving means for coins of various denominations, a selector accessible to said paystation, means for seizing said selector when a call is initiated by said paystation, a coin spring in said receiving means operated by deposited coins of initially acceptable denominations, another coin spring operable by deposited coins of initially unacceptable denominations, a marking potential, means included in said calling device and operated after only the first digit dialled is completed and only when said first coin spring has been operated for transmitting said marking potential, a relay operated upon receipt of said marking potential, means operated by said relay for permitting said selector to further extend said call, another relay, means for operating said other relay only when said other coin spring is operated, means operated by said other relay when operated for preventing the call from being further extended, and means also operated by said other relay for operating said magnet to refund any initially unacceptable deposited coins.

5. In an automatic telephone system as claimed in claim 4, the operating of said disposal magnet restoring said coin springs to normal.

6. In an automatic telephone system as claimed in claim 4, said marking potential sent being a ground pulse and said other relay being a differential relay.

7. In an automatic telephone system as claimed in claim 4, said initially acceptable denominations of coins being dimes and quarters and said initially unacceptable coins being nickels.

8. In an automatic telephone system, a paystation having coin receiving means, a regular subscriber station, a finder having a paystation trunk and selector associated therewith and accessible to said stations, means operated by a calling paystation for operating said finder to find and seize said calling paystation and connect said trunk and selector thereto, calling devices at said stations, toll levels in said selector corresponding to a predetermined first digit dialled, a marking potential, means included in said calling device at only said paystation and operated by said calling device for sending and marking potential to said selector immediately following a first digit dialled only when a coin of a certain predetermined value has been deposited, a relay in said selector operable in receipt of said marking potential, and means operated by said relay, in case said first digit dialled at said paystation was a toll digit, for permitting said selector to seize a toll trunk.

9. In an automatic telephone system, a paystation having a calling device, a regular subscribers station, a finder having a paystation trunk and selector associated therewith and accessible to said stations, means operated by a calling station for operating said finder to find and seize said calling station and connect said trunk and selector therewith, a starting relay in said paystation trunk, a first marking potential, said first marking potential being present only in case said calling station is a paystation, said starting relay operated by said marking potential when said finder finds said calling paystation, a second marking potential, means in said paystation calling device and operated immediately thereby after completion of the first dialled digit for transmitting said second marking potential to said paystation trunk only when a coin of a predetermined value has been deposited, a second relay in said paystation trunk and operated upon receipt of said second marking potential, said operation of said second relay thereby determining that a proper value coin has been deposited, means operated by the operation of said second relay for permitting the further extension of the call, and means for completing a connection through said paystation trunk from said regular subscriber station to said selector bypassing said relays in said control trunk.

CLARENCE E. LOMAX.

References Cited in the file of this patent

UNITED STATES PATENTS

| Number | Name | Date |
|---|---|---|
| 1,200,788 | Williams | Oct. 10, 1916 |
| 1,792,452 | Tharp et al. | Feb. 10, 1931 |
| 1,855,724 | Nelson | Apr. 26, 1932 |
| 1,859,885 | Paine | May 24, 1932 |
| 1,924,095 | Griffins | Aug. 29, 1933 |
| 2,204,083 | Hoyt | June 11, 1940 |
| 2,226,731 | Lomax | Dec. 31, 1940 |
| 2,509,477 | Carson | May 30, 1950 |
| 2,642,496 | Dewar | June 16, 1953 |